United States Patent Office 3,005,918
Patented Oct. 24, 1961

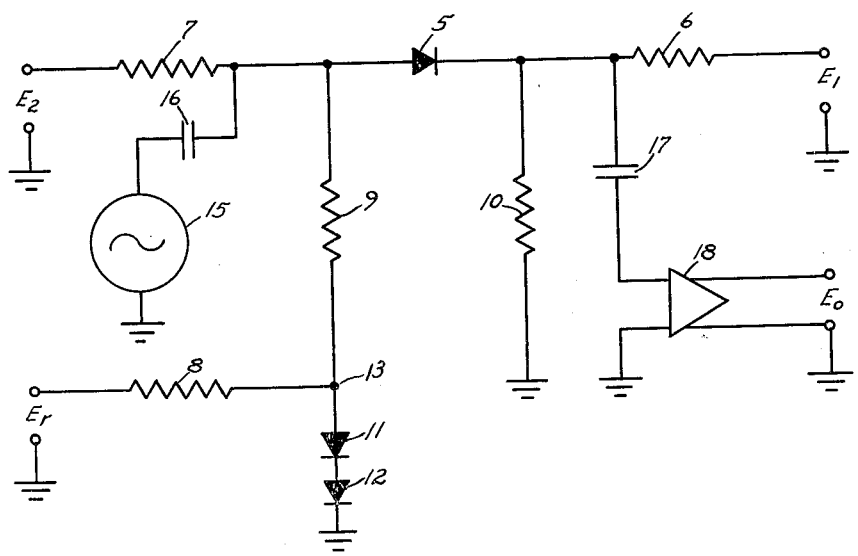
INVENTOR.
JOHN RICHARD JUDKINS
BY
ATTORNEYS

3,005,918
TEMPERATURE COMPENSATED VOLTAGE
COMPARISON CIRCUIT
John Richard Judkins, Indianapolis, Ind., assignor to the United States of America as represented by the Secretary of the Navy
Filed Aug. 26, 1959, Ser. No. 836,313
5 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

This invention relates to direct current voltage comparison circuits and more particularly to direct current voltage comparison circuits utilizing a semiconductor diode such as a silicon diode to compare two direct current voltages which circuits are threshold compensated for temperature by similar semiconductor or silicon diodes.

While voltage comparison circuits utilizing vacuum tube diodes or triodes coupled by transformers or other means are well known and such circuits have been successful in use, these vacuum tube circuits are reliable usually to the extent that the vacuum tubes are reliable. It is also well known that vacuum tubes, due to the delicacy of their grid and filament construction, are not able to withstand too much vibration as is often encountered in aircraft installations. Further, vacuum tube voltage comparator circuits which are transformer coupled produce considerable weight and require considerable space which is objectionable in aircraft installations where space and weight are at a premium. It is also known in the art to utilize transistors for comparing direct current voltages for certain requirements of electronic, radar, or range installations and these transistor circuits have likewise proved successful in use. In transistor voltage comparison circuits a plurality of transistors are usually necessary together with companion circuitry to carry out the voltage comparison function and such transistor circuitry is light in weight and requires a small amount of space in installation. Although the above known voltage comparison transistor circuits have been successful in use and operation and the transistor voltage comparison circuits have overcome many of the disadvantages of the vacuum tube comparison circuits, a further simplification of transistor voltage comparison circuits is desirable so that additional reduction in size and weight of these circuits can be achieved for aircraft application.

In the present invention, a single semiconductor silicon diode is used to compare two direct current voltages and two similar silicon diodes are utilized to compensate for any threshold voltage changes in the comparator diode resulting from temperature variations. The additional components necessary to complete the voltage comparison circuit are resistors and capacitors which require little additional space and are extremely light in weight. The only further requirement in the use of the voltage comparison circuit of this invention is that the comparator diode and the two temperature compensating diodes must be subjected to the same ambient temperature to provide proper and accurate voltage comparison. It is, therefore, a general object of this invention to provide a direct current voltage comparison circuit utilizing a single silicon voltage comparison diode which is temperature compensated by diode means similar in characteristics to the comparator diode.

These and other objects and the attendant advantages, uses, and features may become more apparent to those skilled in the art as the more detailed description proceeds when considered along with the accompanying figure of drawing illustrating a preferred embodiment of this invention in circuit diagram.

Referring more particularly to the drawing, a single silicon diode 5 has two direct current voltages $E_1$ and $E_2$ coupled thereto through current controlling resistors 6 and 7, the direct current voltage $E_1$ being coupled to the cathode and the direct current voltage $E_2$ being coupled to the anode of the comparator diode. As is well understood by those skilled in the art of semiconductor diodes, in order for a current to pass from the anode to the cathode thereof the anode voltage must exceed the cathode voltage by an amount equal to the threshold voltage of the diode. Just as an example, let it be assumed that the $E_1$ direct current voltage is 10 volts and the threshold voltage of the diode 5 is .7 volt, whereby the direct current voltage $E_2$ must be 10.7 volts or higher to produce conduction from $E_2$ to $E_1$. In order to exactly compare voltage $E_2$ with voltage $E_1$, the voltage on the anode of diode 5 must have a voltage added to voltage $E_2$ by an amount of the threshold voltage of diode 5. In order to accomplish this a voltage supply source $E_r$ is coupled to the anode of comparator diode 5 through resistors 8 and 9 with the junction of resistors 8 and 9 being coupled through a pair of compensating diodes 11 and 12 in series to a fixed or ground potential. The resistor 8 is current controlling and the resistor 9 is equal in resistance to the resistor 7. The diodes 11 and 12 must each have substantially the same temperature and voltage characteristics as the comparator diode 5 and accordingly, it is preferred that the diodes 11 and 12 be silicon diodes which are substantially matched to the temperature and voltage characteristics of comparator diode 5. This network from the supply voltage $E_r$ to the anode of diode 5 will produce a compensating voltage at the junction point 13 in a manner later more fully described. As may be recognized, the described circuit having the direct current voltage $E_2$ applied by way of resistor 7 and the compensating voltage at 13 applied by way of resistor 9 produce the sum of these voltages divided by two on the anode when the comparator diode 5 is in the nonconducting state. Therefore, it is necessary that the compensating voltage at 13 be double the voltage required to produce the threshold voltage on the anode of comparator diode 5; that is, using the example as set out above, if the threshold voltage of comparator diode 5 is .7 volt, the compensating voltage at 13 must be 1.4 volts. Two such temperature compensating diodes are necessary since the compensating voltage at 13 must be double the voltage on the anode of comparator diode 5. In order to establish a comparable circuit relation for the direct current voltage $E_1$, the circuit must be made symmetrical. This symmetry is established by a resistor 10 coupled between the cathode of comparator diode 5 and a fixed potential such as ground. The resistances 6 and 10 must be equal in like manner as required of resistances 7 and 9. The direct current voltage $E_1$ will be divided at the cathode of the comparator diode 5 in like manner as the sum of direct current voltages $E_2$ and the compensating voltage 13 on the anode of the comparator diode 5. In this manner the voltage $E_2$ can be compared to the voltage $E_1$ without any additional calculation of threshold voltage for the comparator diode 5.

It is also well understood by those skilled in the art that the forward voltage drop of semiconductor diodes will vary in accordance with temperature changes. Accordingly, in order to accurately compare the direct current voltages $E_1$ and $E_2$ the compensating voltage at 13 must vary the threshold voltage of the comparator diode in accordance with voltage drop changes to exactly compensate for temperature changes. Temperature compensating diodes 11 and 12 should be placed physically in the same ambient temperature with comparator diode 5.

These temperature compensating diodes will compensate for threshold voltage changes in comparator diode 5 resulting from ambient temperature changes by changing the voltage drop of the temperature compensating diodes 11 and 12 to bypass a greater or lesser amount of current from the voltage source $E_r$ through the current controlling resistance 8 to ground to establish the compensating voltage level at 13 through the resistance 9 on the anode of the comparator diode 5 to exactly compensate for the threshold voltage changes produced by temperature changes.

Coupled to the anode of the comparator diode 5 is an alternating current source 15 which is coupled through a blocking capacitor 16. To the cathode of the comparator diode 5 is coupled an output circuit through a blocking capacitor 17 to an amplifier 18. The output of amplifier 18 is coupled to output terminals referred to by the reference character $E_o$ which may be coupled to a relay circuit, oscilloscope, or other actuated or other indicating circuitry, as desired. Blocking capacitors 16 and 17 prevent the direct current voltages $E_1$, $E_2$, and $E_r$ from feeding into the alternating current source or the amplifier 18 but are of such capacity to pass the alternating current oscillations produced by the alternating current source 15.

In the operation of this invention let it be assumed for the purpose of example that the direct current voltage $E_2$ is to be compared to the direct current voltage $E_1$ coupled as shown to the comparator diode 5. Let it further be assumed just for the purpose of example herein that the voltage $E_1$ is 10 volts, that the voltage $E_2$ is in an amplitude range about 10 volts, and the threshold voltage of the comparator diode is approximately .7 volt. The voltage $E_r$ should produce a compensating voltage at 13 equal to approximately 1.4 volts to establish the .7 threshold voltage, which threshold voltage summed with voltage $E_2$ and divided by two would equal 5.7 volts on the anode of comparator diode 5. The voltage $E_1$ likewise is divided by the resistors 6 and 10 to produce 5 volts on the cathode of the voltage comparator diode 5. Let it be assumed for the purpose of example that the alternating current voltage source 15 produces a sine wave voltage which will pass the capacitor 16 and be applied to the anode of the comparator diode 5. Since the voltage on the anode of comparator diode 5 is exactly at the threshold voltage, only the positive excursions of the sine wave voltage envelope will be conducted or passed by the voltage comparator diode 5. These positive envelope excursions will be passed by the capacitor 17 and amplified in the amplifier 18 for use in the output circuit $E_o$. If the voltage $E_2$ drops below 10 volts, all of the positive excursions of the sine wave envelope and a part of the negative excursions of the sine wave negative envelope will be conducted through comparator diode 5, capacitor 17, and amplifier 18 to the output $E_o$. On the other hand, if the voltage $E_2$ rises above 10 volts, the lower part of the positive excursions of the sine wave envelope will be blocked from passing through the comparator diode 5, the amount of the positive and/or negative swings of the sine wave voltage passing through the the comparator diode 5 being in a direct ratio with the amount that the amplitude of the voltage $E_2$ is above or below 10 volts. Any indicator such as a cathode ray tube, oscilloscope, or the like coupled to the output $E_o$ will display or otherwise indicate this voltage comparison between the direct current voltage $E_1$ and $E_2$. The voltage $E_o$ could at the same time actuate relays or other circuitry to produce results in accordance with the compared voltages. Any change in the ambient temperature about the diodes 5, 11, and 12 to change the forward voltage drop of the comparator diode 5 and thereby raise or lower the voltage level at which a current will pass will be compensated by the temperature compensating diodes 11 and 12. For example, if the forward voltage drop of the comparator diode 5 increases, the forward voltage drop of temperature compensating diodes 11 and 12 will likewise increase to decrease the voltage drop across resistor 9 which will raise the voltage level on the anode of diode 5 to compensate for the increase in voltage drop. The reverse would be true for a decrease in voltage drop of the diodes. By this novel circuit arrangement the direct current voltage $E_2$ will be accurately compared with the direct current voltage $E_1$ although temperature changes the voltage characteristics of the comparator diode.

While many modifications and changes could be made in the constructional details and features of this invention as shown and described by the preferred embodiment herein to provide a voltage comparison circuit for particular applications, it is to be understood that I desire to be limited only by the scope of the appended claims.

I claim:

1. A temperature compensated voltage comparison circuit comprising: a semiconductor comparator diode having its anode and cathode coupled, respectively, to two voltages to be compared; means applying signal voltages to the anode of said comparator diode and means coupled to said comparator diode cathode responsive to the passage of any part of said signal voltages; a compensating voltage source applied to said comparator diode anode through a coupling impedance for compensating the voltage necessary to equalize the comparator diode threshold voltage; diode means similar to said comparator diode coupled between said compensating voltage source and ground, and subject to the same temperature as said comparator diode, to vary said applied compensating voltage in compensation for threshold voltage changes in said comparator diode resulting from temperature changes; and an impedance means coupled to said comparator diode cathode symmetrical with said coupling impedance in said compensating voltage coupling to said comparator diode equalizing the threshold voltage whereby voltages are compared on the anode and cathode of said comparator diode under all conditions of temperature variations.

2. A temperature compensated voltage comparison circuit as set forth in claim 1 wherein said means applying signal voltages to the anode of said comparator diode is an alternating current coupled through a capacitor and said responsive means is coupled to the cathode through a capacitor.

3. A temperature compensated voltage comparison circuit as set forth in claim 1 wherein said voltages to be compared and applied to the comparator diode anode and cathode are applied through coupling resistors, and said diode means are two diodes serially coupled to ground from the junction of said compensating voltage and its coupling impedance.

4. A temperature compensating voltage comparison circuit as set forth in claim 3 wherein said semiconductor diode and said two diodes in the compensating circuit are silicon diodes.

5. A temperature compensating voltage comparison circuit comprising: a comparator silicon diode having its anode and cathode coupled, respectively, to two direct current voltages to be compared, each coupled through equal coupling resistance; a reference voltage applied to the anode of said comparator silicon diode through a resistance equal to the anode coupling resistance for raising the anode voltage an amount equal to the threshold voltage of the comparator silicon diode; a pair of silicon diodes coupled serially between said reference voltage and a fixed potential, and subject to the same temperature as said comparator silicon diode, to vary said applied reference voltage to compensate for threshold voltage changes in said comparator silicon diode resulting from temperature variations; an alternating current voltage source coupled through a capacitor to the anode of said comparator silicon diode; a voltage responsive means coupled through a capacitor to the cathode of said comparator silicon diode and responsive to alternating current voltage excursions from said alternating current voltages source above the direct current voltage established by the voltage comparison of said two direct current voltages; and an impedance coupled to the comparator silicon diode cathode equal in impedance to the impedance between said reference voltage and said comparator silicon diode anode to equally divide the compared direct current voltages whereby the voltage envelope excursions of said alternating current voltage source above the established direct current voltage will be effective in said voltage responsive means.

References Cited in the file of this patent
UNITED STATES PATENTS 2,927,223  Meirowitz _____ Mar. 1, 1960

OTHER REFERENCES

Pulse and Digital Circuits, by Millman and Taub, 1956, pages 430–435.